(12) United States Patent
Fujino

(10) Patent No.: US 6,809,785 B2
(45) Date of Patent: Oct. 26, 2004

(54) SEMIPERMEABLE LIQUID CRYSTAL DISPLAY DEVICE AND MANUFACTURING METHOD THEREOF

(75) Inventor: Masahiro Fujino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/951,066

(22) Filed: Sep. 12, 2001

(65) Prior Publication Data
US 2002/0176029 A1 Nov. 28, 2002

(30) Foreign Application Priority Data

Sep. 14, 2000 (JP) ...................................... P2000-281023
Nov. 28, 2000 (JP) ...................................... P2000-361069

(51) Int. Cl.$^7$ .......................... G02F 1/1335; C09K 19/02
(52) U.S. Cl. ....................... 349/114; 349/183; 349/184; 349/185; 349/186
(58) Field of Search ................................ 349/114, 183, 349/184, 185, 186, 113

(56) References Cited

U.S. PATENT DOCUMENTS 5,926,242 A * 7/1999 Kataoka et al. ............. 349/117
6,172,726 B1 * 1/2001 Matsute et al. ............. 349/113
6,295,109 B1 * 9/2001 Kubo et al. ................. 349/119

* cited by examiner

Primary Examiner—Robert H. Kim
Assistant Examiner—Hoan Nguyen
(74) Attorney, Agent, or Firm—Sonnenschein, Nath & Rosenthal LLP

(57) ABSTRACT

Simplified manufacturing method for active matrix type semipermeable liquid crystal display devices also having improved productivity. In a manufacturing method for an active matrix type semipermeable liquid crystal display device, an interlayered insulator film is formed and processed in process A for forming an interlayered insulator film on a silicon layer forming the source and drain of the TFT; in a process B for forming a photoresist layer on the interlayered insulator film; in a process C for forming the photoresist layer in a designated pattern using a mask formed with a pattern below the resolution limit in the section for forming the reflecting electrode; in a process D for patterning the photoresist layer made in process C as the etching mask for etching the interlayered insulator film. After the process D, a source electrode, signal lines, drain electrode and reflecting electrode are simultaneously formed from the metallic film.

1 Claim, 6 Drawing Sheets

SEMIPERMEABLE LIQUID CRYSTAL DISPLAY DEVICE AND MANUFACTURING METHOD THEREOF

RELATED APPLICATION DATA

The present application claims priority to Japanese Application(s) No(s). P2000-281023 filed Sep. 14, 2000, and P2000-36069 filed Nov. 28, 2000, which application(s) is/are incorporated herein by reference to the extent permitted by law.

1. Field of the Invention

The present invention relates to technology for shortening the manufacturing process for semipermeable liquid crystal display devices by forming surface irregularities on the reflective electrode simultaneously with forming openings on the permeable section of the pixel in the interlayered insulating film on silicon film formed with the source and drain of the thin film transistor.

2. Description of the Related Art

The drive side of the TFT (thin film transistor) substrate of the active matrix type semipermeable liquid crystal display device of the related art having a reflective electrode composed of a reflective diffusion plate formed with surface irregularities, and also having a transparent electrode made from transparent conductive film in the transparent section of the pixel is fabricated as shown in FIG. 12A through FIG. 12I. The process for fabricating liquid crystal devices having a pixel structured from a bottom gate type TFT is shown in FIG. 12A through FIG. 12I, however a pixel with a top gate type structure TFT is fabricated in basically the same process.

As shown in 12A, a metallic film is first formed on a transparent substrate 1, and a gate G and an auxiliary capacitor electrode Cs formed by etching using photolithography, a gate insulation film 2 deposited, and a polysilicon film 3 formed.

Next, to prevent doping of impurities into the channels during impurity doping of the source and drain regions, a stopper 4 is formed to self-align with the gate G on the polysilicon film comprising the channels, and the source region and drain region are doped with impurities.

Islands shapes are then formed separately on the polysilicon film 3 using the photoresist process and the etching process, and a low temperature thin film transistor (TFT) is formed.

The interlayered insulator film 5 is formed next in FIG. 12B. Next, in order to form contact holes and an opening for the pixel transparent section, a photoresist layer 6 is first of all formed on the interlayered insulator film 5, and the photoresist layer 6 is patterned in FIG. 12C by the photolithographic method using as a pattern[]mask, to form contact holes and an opening for the pixel permeable section T as the photomask. Etching is then performed using the interlayered insulator film 5 as the etching mask, and contact holes $H_1$ and the pixel permeable section T opening are formed (FIG. 12D).

The metallic film is then formed using a stopper etc. A signal line and source electrode $S_1$ connecting to the TFT source S by way of the contact hole $H_1$ are formed by etching, and a drain source electrode $D_1$ connecting to the drain D of the TFT by way of the contact hole $H_1$ is formed by etching as in FIG. 12E.

The irregularities forming the base of the surface irregularities of the reflective electrode having a reflective diffuser function are formed as described next using two layers of photoresist material. A first layer 7 forming the basic structure of the irregular shape is formed by photolithography using the photoresist material in FIG. 12F. The photomask is used to make openings for a second collector hole 2 and pixel permeable section T for conduction between the source electrode $S_1$ and drain electrode $D_1$. Next, a second layer 8 for improving the reflection is formed as shown in FIG. 12G by photolithography using a photoresist material identical to the first layer 7. The mask is utilized to make openings for the third collector hole H3 and pixel permeable section T for connection with the drain electrode $D_1$. A surface irregularity (rough) section is in this way formed from the first layer 7 and second layer 8 structure.

A transparent conducting film 9 constituting the transparent electrode of the pixel permeable section T is next formed by sputtering, etc. This transparent conducting film 9 connects to the drain electrode $D_1$ and contact hole H3 as shown in FIG. 12H. The transparent conducting film 9 also forms the reflecting section of the pixel and may also be used as the base material (or underlayer) of the reflecting electrode.

A metallic film such as aluminum or silver having high reflectivity is next deposited on the reflecting section R of the pixel, and a reflecting electrode 10 is formed as in FIG. 12I by photolithography.

The drive side of the TFT substrate is in this way completed. A polarizing film is coated on this TFT substrate, and opposing substrate formed of the color filter and opposing transparent electrode, and a polarizing process is performed, both the substrates are overlapped on each other using a gap material to maintain a suitable gap between the substrates, liquid crystal injected and sealed to obtain the liquid crystal display panel.

In the fabrication process for the drive side substrate of the TFT (thin film transistor) substrate of the active matrix type semipermeable liquid crystal display device of the related art as shown in FIG. 12A through FIG. 12I, a seventh and an eighth layer are formed from photoresist material to apply specified surface irregularities (rough shape) to a reflecting electrode 10, and since ultimately a total of three insulating layers including an interlayered insulator film 5 are formed between the reflecting electrode 10 and the silicon film forming the source S and drain D of the TFT, that require patterning processes by respective lithographic methods, and further since a source electrode $S_1$, a drain source electrode $D_1$, and a reflecting electrode 10 must be formed by separate processes, the problem occurs that many man-hours are required and the manufacturing cost is high.

SUMMARY OF THE INVENTION

Whereupon, the present invention has the object of providing a simple and manufacturing process for an active matrix type semipermeable liquid crystal display device yielding improved productivity.

To achieve the above objects, in the manufacturing process for the semipermeable liquid crystal display device by the inventors of the present invention, a photoresist layer is formed on the interlayered insulator film on the silicon layer forming the source and drain of the TFT device, and corresponding surface irregularities are simultaneously formed on the reflecting electrode of the pixel reflecting section, and opening for the pixel transparent section on the photoresist layer, by patterning with photolithographic methods utilizing a designated photomask on that photoresist layer, so that by forming surface irregularities (rough shapes) on the pixel reflecting section simultaneous with forming an opening on the transparent section of the pixel in the interlayered insulator film, a greatly shortened manufacturing process for liquid crystal devices can in this way be obtained.

The present invention in other words, provides a manufacturing method for an active matrix type semipermeable liquid crystal display device consisting of an interlayered insulator film on the silicon layer forming the source and drain of the TFT, a reflecting electrode formed with surface irregularities (rough sections) on the interlayered insulator film in the pixel reflecting section, and a transparent electrode consisting of a transparent conductive film on the pixel transparent section, wherein in the forming and processing of the interlayered insulator film in the following processes A through D;

A: is a process for forming an interlayered insulator film on a silicon layer forming the source and drain of the TFT;

B: is a process for forming a photoresist layer on the interlayered insulator film;

C: a process for patterning the photoresist layer by the photolithographic method wherein, in a process using a mask formed with a pattern below the resolution limit in the section forming the reflecting electrode, the photoresist layer is utilized as the photomask, so that the photoresist layer corresponding to transparent section of the pixel and the section forming the contact holes in the interlayered insulator film of the drain and source can be completely removed, and so that surface irregularities can be formed in the photoresist layer corresponding to the section forming the reflecting electrode, D: a process using the photoresist layer patterned in process C as the etching mask for completely etching an opening in the interlayered insulator film for the transparent (permeable) section of the pixel and the section for forming the contact holes, and for etching the interlayered insulator film so that surface irregularities are formed in the interlayered insulator film of the section forming the reflecting electrode.

The invention further provides a manufacturing method in particular comprising the following sequential processes performed after the D process wherein, E is a process for simultaneously forming from a metallic film; signal wiring and a source electrode connecting with the source by way of contact holes, and a reflecting electrode and drain electrode connecting to the drain by way of contact holes and signal wiring, F is a process for patterning a protective film in a region containing the pixel transparent section and reflecting section, so that the section forming the contact hole on the drain electrode as well as the section for the transparent section of the pixel have openings, G is a process for forming a transparent conductive film so as to comprise a pattern containing the pixel transparent section and reflecting section, and connect the transparent electrode and reflecting electrode by way of the contact holes, and further in the F process, a patterning method is provided for forming a protective film from the photoresist layer, characterized in that patterning is by the lithographic method, and in a process using a mask formed with a pattern below the resolution limit in the section for forming the reflecting electrode, the protective film is utilized as photomask, so that a protective film corresponding to the section forming the drain electrode and permeable sections of the pixel can be completely removed, and surface irregularities (rough sections) can be formed in the protective film corresponding to the section forming the reflecting electrode.

The invention further provides a manufacturing method comprising the following sequential methods performed after the D process wherein, E is a process for simultaneously forming from a metallic film; signal wiring and a source electrode connecting with the source by way of contact holes, and a reflecting electrode and drain electrode connecting to the drain by way of contact holes and signal wiring, $G_y$ is a process for forming a transparent conductive film so as to comprise a pattern containing the pixel transparent section and reflecting section, and connecting the transparent electrode and reflecting electrode, The invention further provides a manufacturing method comprising the following sequential methods performed after the D process wherein, $E_x$ is a process for simultaneously forming a pattern of transparent conductive film wherein said pattern contains signal wiring and a source electrode connecting with the source by way of contact holes, and a permeable and reflecting section of a pixel, and a drain electrode connecting to the drain by way of contact holes, $G_x$ is a process for forming a reflecting electrode from a film composed of metallic film, and connecting to the reflecting electrode and transparent electrode.

The present invention further provides an active matrix type semipermeable liquid crystal display device consisting of an insulation layer on a silicon film formed as the source and drain of the TFT, a reflecting electrode formed with surface irregularities on the insulator layer in the reflecting section of the pixel, and a transparent electrode film made from transparent conductive film in the transparent section of the pixel wherein, the insulator layer is formed from one layer of insulator film.

In a liquid crystal device in particular wherein, the transparent conducting film of the pixel transparent section is extended onto the reflecting electrode, the transparent conducting film connects with the reflecting electrode, and further, a protective film is formed between the reflecting electrode and transparent conducting film, and the cell gap of the liquid crystal display cell is set at $½λ$ in the permeable section and $¼λ$ in the reflecting section, and surface irregularities are formed in the transparent conducting film on the reflecting electrode in this state.

A liquid crystal device of the present invention is provided wherein the transparent conducting film and reflecting electrode are sequentially laminated on the reflecting section of the pixel, and the reflecting electrode and transparent conductive film are connected.

In the manufacturing method for the active matrix type semipermeable liquid crystal display device of the present invention, a photoresist layer is formed on the interlayered insulator film on the silicon film of which the source and drain of the TFT are formed, and by patterning that photoresist layer by utilizing a designated photomask, an opening with a shape corresponding to the transparent section on the pixel and surface irregularities corresponding to the reflecting electrode on the reflecting section of the pixel are formed on the photoresist layer, and by next etching the interlayered insulator film using the photoresist layer as an etching mask, surface irregularities (rough shapes) can be formed on the reflecting electrode of the reflecting section of the pixel and an opening formed in the permeable section of the pixel on the interlayered insulator film. The laminating processes for the photoresist layer required in forming the surface irregularities on the reflecting electrode in the active matrix type semipermeable liquid crystal display device of the related art can therefore be reduced, and the source electrode, signal wiring, drain electrode and reflecting electrode formed by separate processes in the related art can be simultaneously formed by forming one metallic film so that the manufacturing process for a liquid crystal device can be greatly simplified, and productivity can be boosted.

Also in the present invention, the transparent conductive film is extended to the reflecting electrode, and the transparent conductive film and reflecting electrode are electrically connected, so the silver forming the reflecting electrode in the liquid crystal display cell is transferred to the opposing substrate and the crystallization phenomenon can therefore be prevented.

Further in the present invention, by forming a protective film between the reflecting electrode and the transparent conducting film, and by adjusting the thickness of that protective film, the optical characteristics of the reflecting section and permeable section of the pixel can easily be optimized.

DETAILED DESCRIPTION OF THE PREFERRED EMBODIMENTS

Figure 1A:
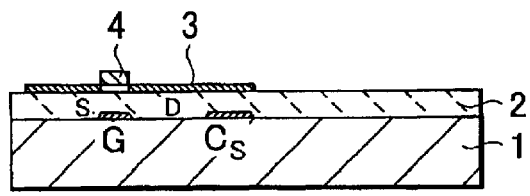
FIG. 1A through FIG. 1G are drawings showing the processes in the manufacturing method for the liquid crystal display device of the present invention.
Figure 1B:
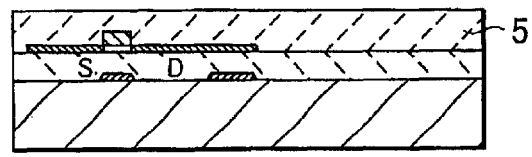
Figure 1C:
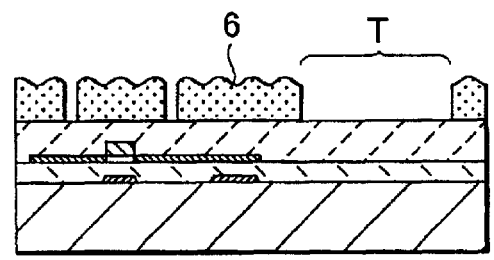
Figure 1D:
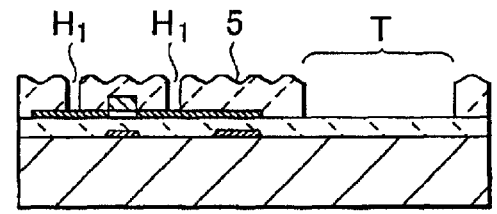

The embodiments of the present invention are hereafter described in detail while referring to the accompanying drawings. In the drawings, sections with the same reference numerals are the same or equivalent structural components.

FIG. 1 is process drawings of the embodiment of the present invention for manufacturing a liquid crystal display device having a bottom gate TFT pixel structure.

First of all in this method, metallic film such as of molybdenum, chromium, aluminum, tantalum, wolfram as shown in FIG. 1A, is formed on the transparent substrate 1, and a gate G and auxiliary capacitor electrode Cs formed by dry etching using a photolithographic technique, and a silicon nitride film or silicon oxide film formed as the gate insulator film 2 by sputtering or carrier vapor (CVD) deposition, these films are formed in laminations, and a polysilicon film 3 further formed. The method for forming this polysilicon film 3 is for example, to first form an amorphous semiconductor layer on the gate insulator film 2, and next perform dehydrogenation at a high temperature for lowering the hydrogen concentration of the semiconductor layer, and crystallizing by an excimer laser, converting the semiconductor layer into a polysilicon film. The dehydrogenation process may be omitted if the concentration of hydrogen atoms is less than one percent. The gate insulator film and amorphous semiconductor layer are preferably formed consecutively to obtain stable film quality.

A stopper 4 is next formed to self-align with the gate G on the polysilicon film 3 forming the channel section to prevent injection during doping of impurities into the source region and drain region. The stopper 4 here, is a stopper film formed from silicon oxide on the gate insulator film 4, and then coated on top with resist, and by exposing the rear side of the resist layer to light using the gate G as a mask, the resist is patterned so that the gate G self-aligns with the section formed as the channel, and etching of the stopper film further performed using this resist layer as the mask, and so a stopper film remains in the channel forming section.

The source and drain region are then doped with impurities using ion implantation and ion doping techniques, and the source S and drain D are formed. The photoresist process and etching process are used to form the polysilicon film into separate island shapes, and the TFT is formed. The above method for forming the TFT was a low-temperature polysilicon thin-film-transistor forming method, however the manufacturing method of the present invention may also be applied to forming amorphous silicon thin-film transistors.

The forming and processing of the interlayered insulator film is next performed using the processes A through D.

An interlayered insulator film 5 is formed (FIG. 1B) from inorganic insulator material such as laminations of silicon nitride film and silicon oxide film by the carrier vapor deposition (CVD) method or sputtering method.

In process B, a photoresist layer 6 is formed on the interlayered insulator film 5.

In process C, the photoresist layer 6 is patterned (FIG. 1C) by a photolithographic technique. In this case, the photoresist layer 6 can be completely removed from portions corresponding to the section for forming contact holes $H_1$ and the permeable section T of the pixel formed on the interlayered insulator film 5 of the source S and drain D; and a pattern below the resolution limit of the stepper in the reflecting electrode forming section can be formed using the photomask of photoresist layer 6 so that irregular surfaces are formed in the photoresist layer 6 corresponding to the electrode forming section.

Figure 5:
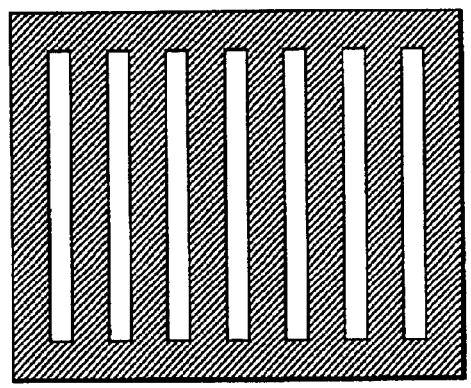
FIG. 5 is a flat view of a photomask having a line and space pattern.
Figure 6:
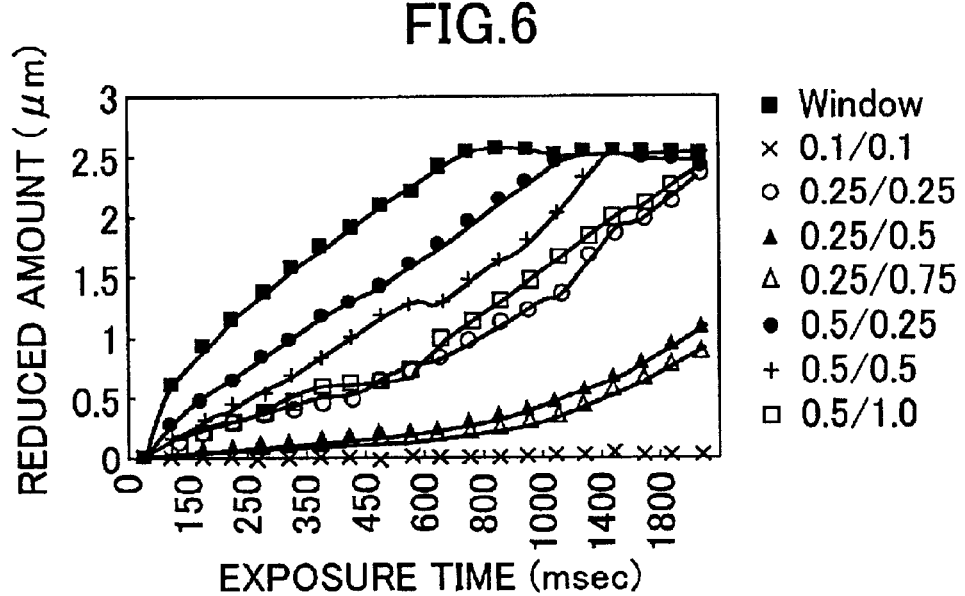
FIG. 6 is a graph showing the interrelation of the photomask line and spaces, the exposure time, and reduction in film thickness of the photoresist layer in the photolithographic process of the photoresist layer.
Figure 7:
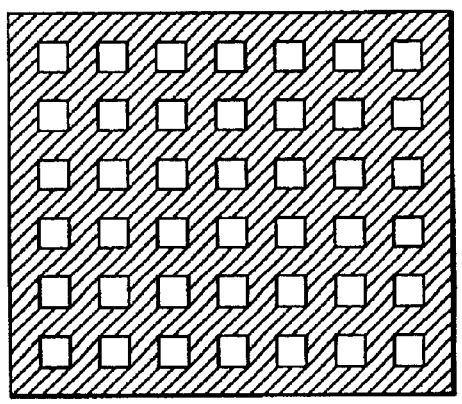
FIG. 7 is a flat view of a photomask having a dot pattern.

The actual photomask configuration can be experimentally determined by finding the interrelation between the photomask pattern, and the exposure time and film thickness reduction of the photoresist layer. For example, when the line and space (hereafter abbreviated to L/S) pattern shown in FIG. 5 is exposed to light with the stepper, the interrelation of the light exposure time and film thickness reduction amount of photoresist layer is changed according to the L/S (lines and spaces) as shown in FIG. 6. The "Window" outside the graph frame in FIG. 6 shows the case when the S (space) resolution is greater than the light exposure device. The numerals such as on the right side of the × indicate the L (μm)/S (μm). In FIG. 6, when the section on the photoresist layer for forming the contact hole is completely opened to a light exposure amount of 1200 milliseconds, it can be seen that the photoresist layer can have a film thickness reduction amount of 0.6 μm when L=0.25 μm, S=0.50 μm is selected.

When experimentally finding the reduction in film thickness in this way, the dot pattern shown in FIG. 6 may also be utilized instead of the L/S pattern of FIG. 5.

Besides the above, a more detailed photomask configuration can be calculated from the optical index constant, and the photoresist layer film thickness can be controlled by the effective transmittance (permeance) rate of the photomask.

Figure 8:
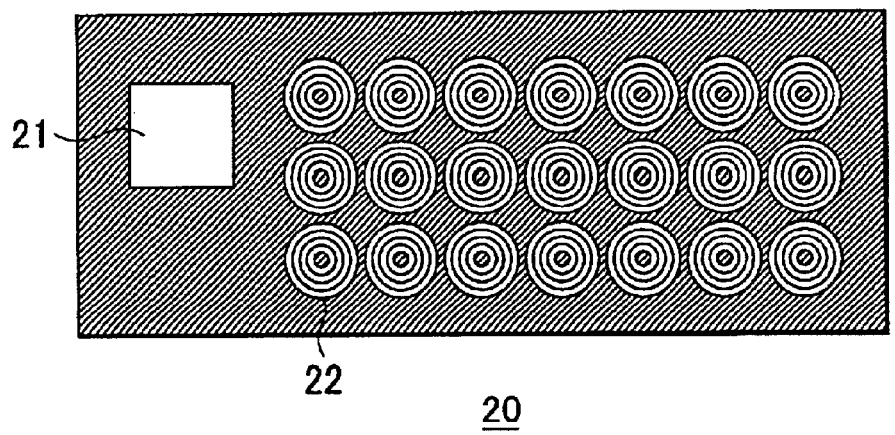
FIG. 8 is a flat view of the photomask used on the photoresist layer.
Figure 9A:
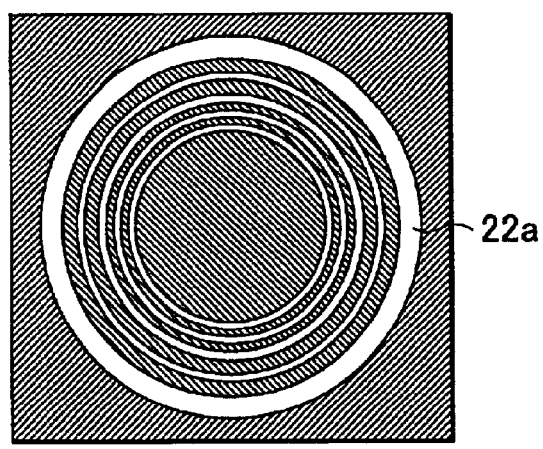
FIG. 9A is a flat view of the photomask pattern for forming surface irregularities on the photoresist layer.
Figure 9B:
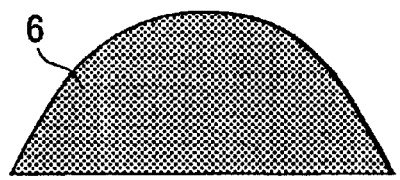
FIG. 9B is a side view of the photoresist layer surface irregularities formed by using the mask of FIG. 9A.

The actual photomask pattern is formed consecutively or in steps in patterns not capable of being resolved by the stepper. When forming the section 21 to completely open the photoresist layer to light exposure and forming the section for forming surface irregularities on the photoresist layer, as shown in the photomask 20 of FIG. 8 for example, the pattern sections 22 forming the irregular section, can constitute the plurality of fine, concentric, ring-shaped patterns 22a shown in FIG. 9A not capable of being resolved by the stepper. By exposing and developing the photoresist layer to light using this kind of photomask, not only can completely open sections and sections formed with surface irregularities be formed on the photoresist layer, but by heating and reflowing after developing as shown in FIG. 9B, each of the patterns forming the surface irregularities on the photoresist layer 6 can be made into smooth shapes.

Figure 10A:
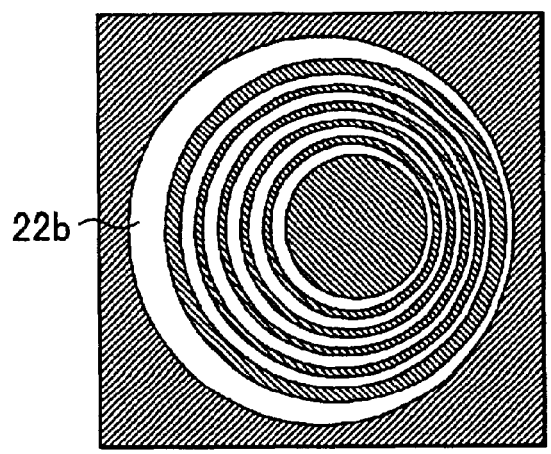
FIG. 10A is a flat view of the photomask pattern for forming surface irregularities on the photoresist layer.
Figure 10B:
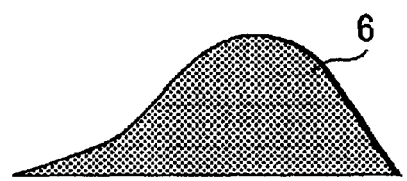
FIG. 10B is a side view of the photoresist layer surface irregularities formed by using the mask of FIG. 10A.

Particular patterns that correspond to the shapes of particular surface irregularities may be utilized as photomask patterns, such as the surface irregularities formed on the interlayered insulator film 5 for enhancing the reflectivity of the reflecting electrode in a specific direction. The plurality of ring patterns are for example made off-center (eccentric) as shown in FIG. 10A. By then using this photomask to expose and develop the photoresist layer 6, and by then reflowing as necessary, each of the pattern shapes forming the surface irregularities of the photoresist layer 6, can be given a sharp incline on one side, and can be given gentle incline on the other side surface as shown in FIG. 10B.

Figure 11:
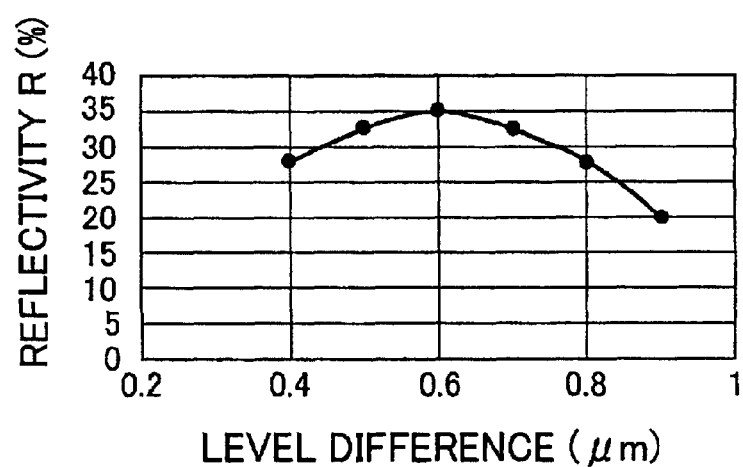
FIG. 11 is a graph showing the interrelation of the reflectivity and the level difference of the surface irregularities of the reflecting electrode.
Figure 12A:
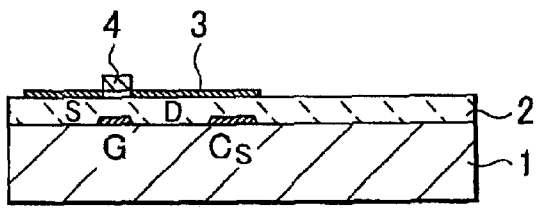
FIG. 12A through FIG. 12I are drawings showing the processes in the manufacturing method for the active matrix type semipermeable liquid crystal display device of the related art.
Figure 12B:
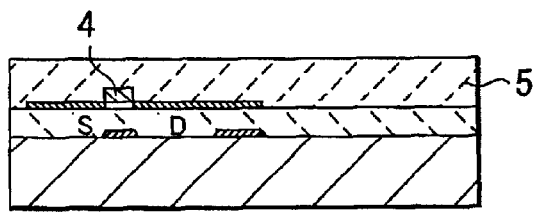
Figure 12C:
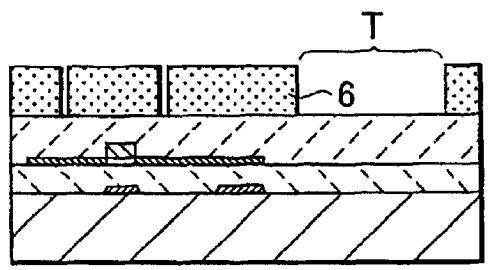
Figure 12D:
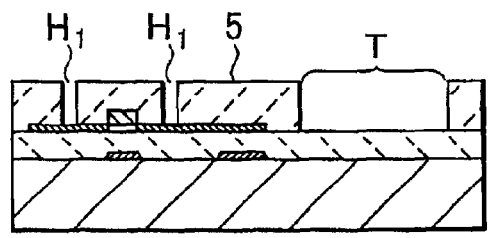
Figure 12E:
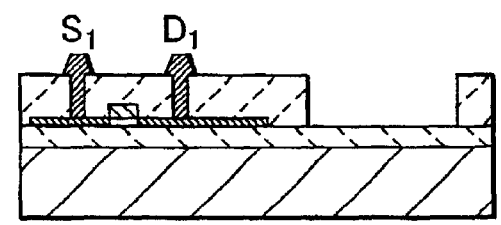
Figure 12F:
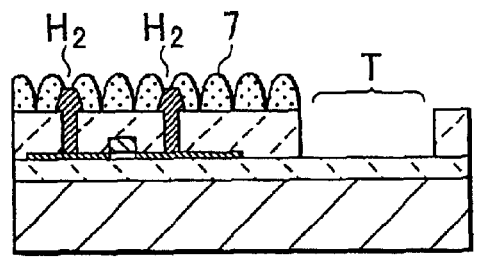
Figure 12G:
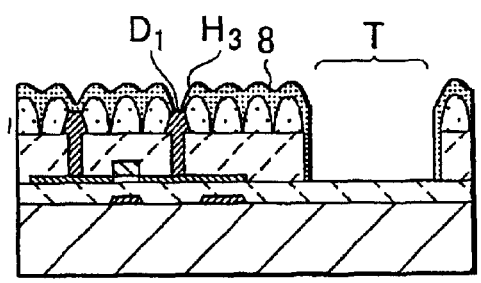
Figure 12H:
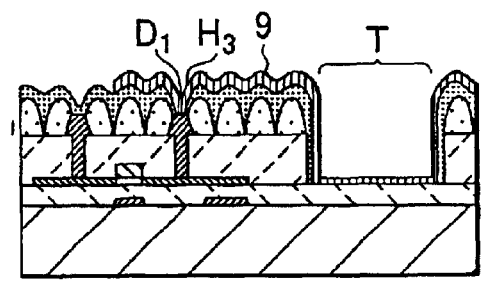
Figure 12I:
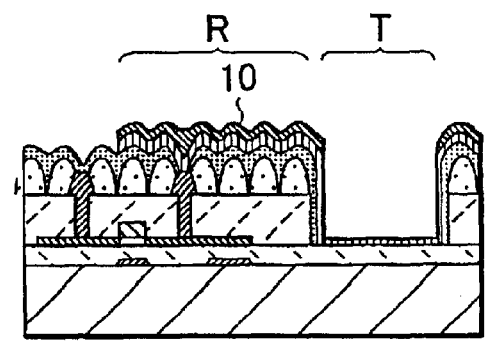

The reflectivity (rate) of the reflecting electrode is dependent on the level difference (step) formed in the photoresist layer 6 as shown in FIG. 11. The level difference of the pattern is determined by factors such as the pattern shape of the photomask and amount of exposure so that the amount of light exposure on the photoresist layer 6 and the photomask pattern can be set as needed by forming the level difference (step) to obtain the specified reflectivity for the reflecting electrode.

When the interlayered insulator film 5 is dry-etched using the patterned photoresist layer 6 as the etching mask, the shape of the photoresist layer 6 is transferred to the interlayered insulator film 5. At this point, in the present invention, the process D is next performed.

In process D, the photoresist layer patterned in the above described process C is used as the etching mask, and the interlayered insulator film 5 etched by dry etching after removal of the resist layer by a method such as the RIE method or the ICP method, so that the section forming the contact hole $H_1$ and the interlayered insulator film for the permeable section of the pixel are completely opened, and surface irregularities are formed on the interlayered insulator film 5 at the section for forming the reflecting electrode.

After the interlayered insulator film 5 is formed in the process D in this way, any further laminating of insulator films is unnecessary for forming the surface irregularities on the reflecting electrode. Therefore, when limited to the forming a metallic film on this interlayered insulator film 5 to form a reflecting electrode, and on the other hand forming a transparent electrode made from a transparent conductive film in the transparent section of the pixel, a drive side TFT substrate can easily be obtained and an active matrix type semipermeable liquid crystal display device can be manufactured. In this case, the reflecting electrode and transparent electrode can be formed by the desired forming method and forming sequence, and an optional layer such as a protective film can be added as needed. Further, liquid crystal display panels can be fabricated by the normal method utilizing this TFT substrate and liquid crystal display panels can be manufactured.

The liquid crystal device manufactured in this way is the same as the active matrix type semipermeable liquid crystal display device of the known art in the points of having an insulator layer on a silicon film comprising the source S and drain D of the TFT, and having a reflecting electrode made from reflective diffusion plate formed with surface irregularities, and also in having a transparent electrode made from transparent conductive film in the transparent section of the pixel. However this liquid crystal device is characterized in that the insulator layer between the silicon film and the reflecting electrode is formed from one layer of insulator film. The present invention therefore also includes the structure relating to the liquid crystal display device.

Figure 1E:
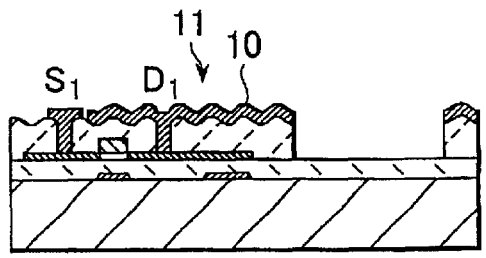
Figure 1F:
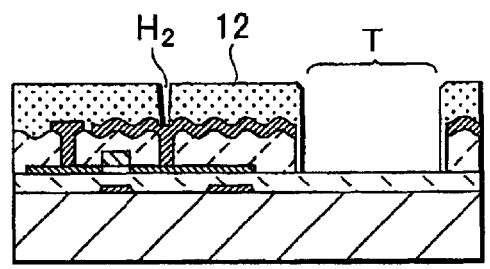
Figure 1G:
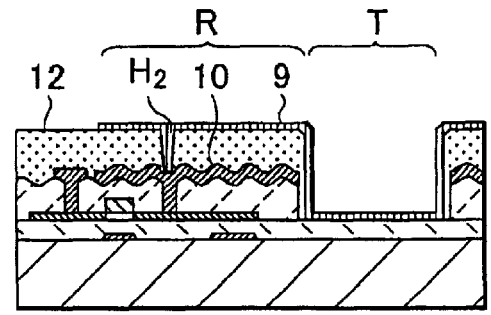

The manufacturing method for the liquid crystal display device of the present invention including the processes subsequent to process D, is performed sequentially in the following processes E through G as shown in FIG. 1E through FIG. 1G.

In process E, a high reflectivity metal such as aluminum, silver, aluminum alloy or silver alloy is deposited by sputtering to form the metallic film 11, and then a signal line and source electrode $S_1$ connecting to the source S by way of the contact hole $H_1$, as well as a reflecting electrode 10 and drain electrode $D_1$ connecting with the drain D by way of the contact hole $H_1$ are simultaneously formed by patterning by photolithographic methods and by etching in FIG. 1E. In this case, the structure of the metallic film 11 may comprise many layers of high reflectivity conductive film such as aluminum, silver, aluminum alloy or silver alloy, and metallic film such as chromium, molybdenum, titanium, tantalum and wolfram.

In process F, a protective film 12 composed of photoresist is formed in the region including the reflecting and permeable sections of the pixel. This protective film 12 is patterned so that the section formed with the drain electrode $D_1$ and the permeable section T of the pixel have openings as in FIG. 1F. Silicon oxides for example, may be used in the forming methods to form the protective film 12 and patterning performed by photolithograpic and etching processes, however from the point of view of shortening the process, preferably a film of photoresist is formed as in this process F, and patterning of that photoresist then performed only by a photolithographic process.

The thickness of the protective film 12 is preferably set so the cell gap of the liquid crystal display cell is ½λ in the permeable section and ¼λ in the reflecting section of the pixel. The cell gap for this kind of liquid crystal display cell must generally meet specifications that demand brightness on the screen, however in the present invention, a cell gap can easily be formed by adjusting the thickness of the protective film 12.

In process G, the transparent conductive film 9 is formed to be the pattern containing the reflecting section and permeable section of the pixel, and the TFT substrate obtained as shown in FIG. 1G. This transparent conductive film 9 is for example formed using ITO as a sputtering method, and patterning then performed by a photolithography process and an etching process. The transparent conductive film 9 pattern may be formed only in the permeable sections of the pixel and in the contact sections with the reflecting and permeable sections of the pixel however, rather than just the contact sections with the pixel reflecting and permeable sections, the transparent conductive film 9 can be extended to the reflective electrode 10 and connected to the (same) electrical potential as the reflecting electrode 10 by way of the contact hole $H_2$ so that the silver forming the reflecting electrode 10 is transferred to the opposing substrate and the crystallization phenomenon can be prevented in the liquid crystal cell.

The TFT substrate that was obtained, and the opposing (facing) substrate on which are formed the color filter and opposing transparent electrode are coated with wiring polarizing film, and polarizing is performed, both substrates attached onto each other with sealer using the gap material to maintain a suitable gap between the two substrates, and the liquid crystal is then injected and sealed to obtain the liquid crystal display panel.

Figure 2A:
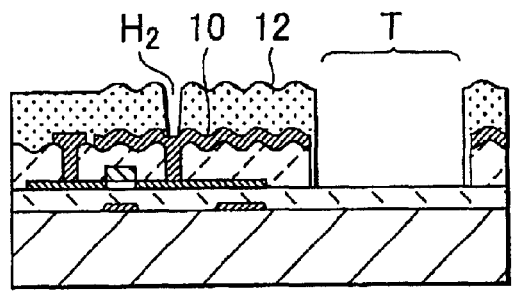
FIG. 2A and FIG. 2B are drawings showing the processes in the manufacturing method for the liquid crystal display device of the present invention.
Figure 2B:
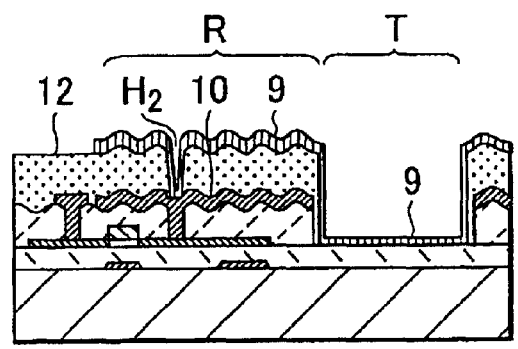

In another manufacturing method of the present invention, the section for forming the contact hole $H_2$ on the drain electrode $D_1$ and the permeable section T of the protective film 12 made of photoresist can be completely removed in the patterning of the protective film 12 in the above described process F, and a pattern below the resolution limit of the stepper in the reflecting electrode forming section formed using the photomask of the protective film 12 so that irregular surfaces are formed in the reflecting electrode 10 forming section, and the protective film 12 maybe exposed and developed using the mask of this pattern. A protective film 12 such as in FIG. 2A can in this way be patterned.

After the patterning of the protective film 12, the transparent conductive film 9 is formed to be the pattern containing the reflecting section and permeable section of the pixel in process G described above, and the TFT substrate obtained. On the TFT substrate formed in this way, external light irradiating onto the section in the vicinity of the flat reflecting bottom of the surface irregularities of the reflecting electrode 10 is scattered (or diffused), and the percentage of external light irradiating onto the flat surface of the reflecting electrode 10 is reduced, and also the light reflecting from the reflecting electrode 10 is further scattered (or diffused) due to a differential in the refraction rate between the protective film 12 and the transparent conductive film 9, so that the reflecting properties of the reflecting section R of the pixel can be improved.

Figure 3:
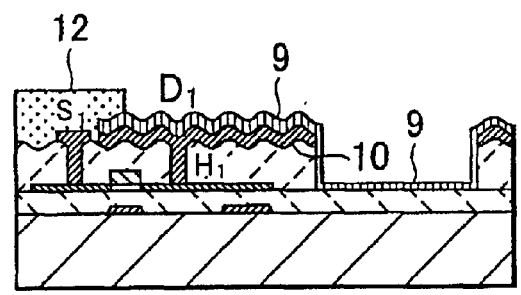
FIG. 3 is a cross sectional drawing of the thin film transistor substrate obtained by the manufacturing method of the present invention.

In yet another manufacturing method of the present invention, after forming the source electrode $S_1$, signal wiring, drain electrode $D_1$ and the reflecting electrode 10, in the previously described process E, rather than forming the protective film 12 into a pixel region, the transparent conductive film 9 may be formed in the same way as process G (process $G_y$) and a TFT substrate manufactured as shown in FIG. 3.

Figure 4:
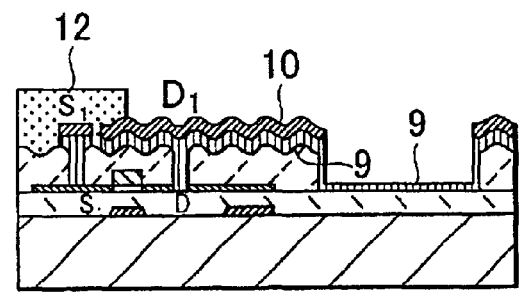
FIG. 4 is a cross sectional drawing of the thin film transistor substrate obtained by the manufacturing method of the present invention.

Also, after etching the interlayered insulator film 5, in a process $E_x$, a pattern may be simultaneously formed of transparent conductive film 9 wherein said pattern contains signal wiring and a source electrode $S_1$ connecting with the source S by way of contact holes $H_1$, and a permeable and reflecting section of a pixel, and a drain electrode $D_1$ connecting to the drain D by way of contact holes $H_1$, and in a process $G_x$, a reflecting electrode 10 may be formed, and the reflecting electrode 10 and transparent conductive film 9 are connected by a film composed of aluminum, silver, aluminum alloy or silver alloy, and these processes are performed in sequence, and a TFT substrate may be manufactured of laminations of the reflecting electrode 10 on the transparent conductive film 9 as shown in FIG. 4. Here, when the transparent conductive film 9 is formed by ITO, a film of molybdenum or titanium is preferably formed beforehand on the ITO film, and the metallic film 11 then deposited afterwards.

The present invention was described while referring to the above work drawings however, the present invention may constitute various embodiments and configurations. For example, a liquid crystal display device having a bottom gate TFT in the pixel structure was shown in the drawings, however the present invention is also adaptable in the same way to liquid crystal display devices having a top gate TFT in the pixel structure.

What is claimed is:

1. An active matrix type semipermeable liquid crystal display device comprising an insulator film on a silicon layer forming a source and a drain of a thin-film-transistor, a reflecting electrode formed with surface irregularities on said insulator film in a reflecting section of a pixel, and a transparent electrode made of transparent conductive film on a transparent section of said pixel, wherein an insulator layer between said silicon layer and said reflecting electrode is formed from one layer of insulator film, wherein said transparent conductive film extends to said reflective electrode and said transparent conductive film and reflecting electrode are connected, wherein a protective film is installed between said reflecting electrode and said transparent conductive film, and said cell gap of said liquid crystal display cell is formed by adjusting the thickness of said protective film to $½λ$ in the permeable section and set to $¼λ$ in the reflecting section of said pixel.

* * * * *